United States Patent
Li et al.

(10) Patent No.: US 9,673,695 B1
(45) Date of Patent: Jun. 6, 2017

(54) SYSTEM AND METHOD FOR INTELLIGENT CIRCUIT BREAKING IN ADJUSTABLE SPEED DRIVES

(71) Applicant: Eaton Corporation, Cleveland, OH (US)

(72) Inventors: Xiaoling Li, Shenzhen (CN); Huaqiang Li, Menomonee Falls, WI (US); Robert Fenton, Menomonee Falls, WI (US); Zhiguo Lu, Shenzhen (CN); Belly Lei, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/163,411

(22) Filed: May 24, 2016

(51) Int. Cl.
| | | |
|---|---|---|
| H02M 1/32 | (2007.01) | |
| H02M 5/45 | (2006.01) | |
| H02M 1/44 | (2007.01) | |
| G01R 19/165 | (2006.01) | |

(52) U.S. Cl.
CPC ........ *H02M 1/32* (2013.01); *G01R 19/16538* (2013.01); *H02M 1/44* (2013.01); *H02M 5/4505* (2013.01)

(58) Field of Classification Search
CPC ........ H02M 1/32; H02M 1/44; H02M 5/4505; G01R 19/16538
See application file for complete search history.

(56) References Cited

U.S. PATENT DOCUMENTS

| | | | | |
|---|---|---|---|---|
| 5,715,154 | A * | 2/1998 | Rault | H02M 1/32 323/908 |
| 6,798,166 | B2 * | 9/2004 | Godefroy | H02J 7/1423 320/104 |
| 8,816,625 | B2 * | 8/2014 | Kopiness | H02M 1/36 363/49 |
| 2008/0186750 | A1 * | 8/2008 | Gilmore | H02M 1/36 363/129 |
| 2010/0080022 | A1 * | 4/2010 | Schmidt | H02M 7/062 363/53 |

(Continued)

OTHER PUBLICATIONS

"Solid Statements", Crydom Inc., Aug. 2011, pp. 1-4.
(Continued)

*Primary Examiner* — Jue Zhang
(74) *Attorney, Agent, or Firm* — Ziolkowski Patent Solutions Group, SC

(57) ABSTRACT

An ASD circuit includes an input, solid-state switch rectifier bridge, DC link, and DC link capacitor bank. A pre-charge circuit is coupled between the input and the DC link capacitor bank and includes pre-charge relays operable in an on state that allows the AC power input to power the rectifier bridge during a normal operating state and an off state that allows the AC power input to pre-charge the DC link capacitor bank through a pre-charge resistor of the pre-charge circuit during a pre-charge operating state. A protection relay of a protection circuit is coupled between the pre-charge relays and the DC link capacitor bank, the protection relay operable in an on state that prevents the pre-charge circuit from connecting to the DC link capacitor bank when a capacitor short circuit occurs and an off state that allows the pre-charge circuit to electrically connect to the DC link capacitor bank.

20 Claims, 4 Drawing Sheets

(56) References Cited

U.S. PATENT DOCUMENTS

2016/0268797 A1* 9/2016 Li .................. H02M 5/4585

OTHER PUBLICATIONS

"Phase Control Using Thyristors", Littelfuse, Inc., 2013, pp. 401-409.
Cameron, "Relay Characteristics and Application", IEEE, 1954, pp. 34-47.
UL 61800-5-1, "Standard for Adjustable Speed Electrical Power Drive Systems—Part 5-1: Safety Requirements—Electrical, Thermal and Energy", Jun. 8, 2012, http://ulstandards.ul.com/standard/?id=61800-5-1_1.

* cited by examiner

SYSTEM AND METHOD FOR INTELLIGENT CIRCUIT BREAKING IN ADJUSTABLE SPEED DRIVES

BACKGROUND OF THE INVENTION

The present invention relates generally to adjustable speed drive (ASD) circuits and, more particularly, to a system and method for intelligent circuit breaking for ASD circuits to protect the ASD circuits from being damaged by a fault condition.

One type of system commonly used in industry that performs power conversion is an ASD circuit, also known as a variable frequency drive (VFD) circuit. An ASD is an industrial control device that provides for variable frequency, variable voltage operation of a driven system, such as an AC induction motor. A typical ASD circuit 10 is illustrated in FIG. 1. ASD or VFD circuit 10 includes an electromagnetic interference (EMI) filter 12 provided between a drive input 14 and input rectifier terminals 16. ASD circuit 10 also includes a pre-charge circuit 18 including three pre-charge relays RY1, RY2, RY3, one diode 20 and one gate resistor 22 in series with each pre-charge relay RY1, RY2, RY3, and one pre-charge resistor 24 in series with all three pre-charge relays RY1, RY2, RY3.

ASD circuit 10 further includes a rectifier bridge 26 for converting an AC input power into a DC power. Rectifier bridge 26 includes three silicon-controlled rectifiers (SCRs) 28 that are each coupled in series with one diode 30 and electrically connected to one gate resistor 22 of pre-charge circuit 18. The ASD circuit 10 additionally includes a DC link 32 that receives the DC power from rectifier bridge 26; a DC link capacitor bank 34 having two capacitors 36, 38 across DC link 32; two inductors 40 coupled in series with and on either side of the rectifier bridge 26 on DC link 32; an inverter 42 in parallel with the DC link capacitor bank 34; and an output 44 coupled to the inverter 42.

Pre-charge circuit 18 of ASD 10 operates to control and limit inrush current into DC link capacitor bank 34 during power up (when drive input 14 is initially coupled to an AC input power). Pre-charge relays RY1, RY2, RY3 of pre-charge circuit 18 may be controlled by a controller (not shown) so that when pre-charge relays RY1, RY2, RY3 are in an "OFF" position, pre-charge relays RY1, RY2, RY3 allow current to flow through the pre-charge resistor 24 to pre-charge the DC link capacitor bank 34, and when pre-charge relays RY1, RY2, RY3 are in an "ON" position, pre-charge relays RY1, RY2, RY3 allow current to flow through corresponding gate resistors 22 to power on SCRs 28 of rectifier bridge 26. However, ASD circuit 10 is not protected against any fault conditions that could damage ASD circuit 10.

ASD circuits may be damaged by various internal and external fault conditions. One internal fault condition that occurs in ASD circuits is a short circuit across a DC capacitor in a DC capacitor bank, such as DC capacitor bank 34. A capacitor may develop a short circuit for a variety of reasons including, for example, high temperatures, mechanical damage, aging, or a power disturbance such as a power surge or a voltage transient. In any case, a short circuit across a capacitor in an ASD circuit will cause the ASD circuit to fail. If power is allowed to continue to flow to the capacitor bank when one capacitor has a short circuit, an overvoltage condition will exist on the non-shorted capacitor. This overvoltage condition may, in extreme cases, cause the non-shorted capacitor to catch on fire and possibly explode.

As constructed in the embodiment of FIG. 1, ASD circuit 10 cannot prevent power from continuing to flow to a shorted capacitor in DC capacitor bank 34. That is, as SCRs 28 and diodes 30 of rectifier bridge 26 cannot be controlled to turn off, power can continue to pass through rectifier bridge 26 to DC capacitor bank 34 while a capacitor is shorted. The overvoltage condition on the non-shorted capacitor will cause ASD circuit 10 to be damaged, such that the damaged ASD circuit 10 will not be useable and a user will have to make costly repairs to the ASD circuit or replace the ASD circuit. The user will incur additional economic losses during the downtime period when ASD circuit 10 is not in use.

It would therefore be desirable to provide a system and method for protecting ASD circuits against fault conditions that could damage the ASD circuits.

BRIEF DESCRIPTION OF THE INVENTION

Embodiments of the present invention provide a system and method for intelligent circuit breaking for ASD circuits to protect the ASD circuits from being damaged by a fault condition such as a capacitor short circuit.

In accordance with one aspect of the invention, an ASD circuit includes an input connectable to an AC source, a solid-state switch rectifier bridge connected to the input to convert an AC power input to a DC power, a DC link coupled to the solid-state rectifier bridge to receive the DC power therefrom, and a DC link capacitor bank comprising at least first and second capacitors connected to the DC link to smooth the DC link voltage, each capacitor of the DC link capacitor bank having a capacitor voltage thereacross. The ASD circuit also includes a pre-charge circuit coupled between the input and the DC link capacitor bank, the pre-charge circuit comprising a plurality of pre-charge relays each operable in an on state that allows the AC power input to power the solid-state switch rectifier bridge during a normal operating state and an off state that allows the AC power input to pre-charge the DC link capacitor bank through a pre-charge resistor of the pre-charge circuit during a pre-charge operating state. The ASD circuit further includes a protection circuit comprising a protection relay coupled between the plurality of pre-charge relays and the DC link capacitor bank, the protection relay operable in an on state that prevents the pre-charge circuit from connecting to the DC link capacitor bank when a capacitor short circuit occurs and an off state that allows the pre-charge circuit to electrically connect to the DC link capacitor bank.

In accordance with another aspect of the invention, a method of operating an ASD circuit that comprises a rectifier, a DC link having a DC link capacitor bank with two or more capacitors, a pre-charge circuit, a protection circuit, and an inverter is provided. The method includes receiving an AC power at an input of the ASD circuit, providing the AC power to the rectifier to convert the AC power to a DC power on the DC link, measuring one or more capacitor voltages in the DC link capacitor bank via one or more voltage sensors, and providing the one or more measured capacitor voltages to a controller in operable communication with the one or more voltage sensors, the pre-charge circuit, and the protection circuit. The method also includes analyzing, via the controller, the one or more capacitor voltages during one of a pre-charge voltage condition and a normal voltage condition to detect if one or more capacitors of the DC link capacitor bank have developed a short circuit. The method further includes selectively operating, via the controller, a protection relay in the protection circuit and a set of pre-charge relays in the pre-charge circuit in an on state and an off state, respectively, based on the analyzed one or more capacitor voltages, so as to prevent damage to the ASD circuit as a result of a short circuit on the DC link capacitor bank.

In accordance with yet another aspect of the invention, an ASD circuit includes a rectifier comprising an SCR bridge and a DC link coupled to the rectifier to receive a DC link voltage therefrom, the DC link having a DC link capacitor bank thereon that includes at least two capacitors. The ASD circuit also includes a pre-charge circuit comprising a set of pre-charge relays coupled to the DC link capacitor bank via the DC link, the pre-charge circuit configured to control an initial pre-charge of the DC link capacitor bank via the set of pre-charge relays. The ASD circuit further includes a protection circuit having a protection relay operable in an on and an off position to selectively control a current flowing through the pre-charge circuit to the DC link capacitor bank, a voltage sensing circuit for sensing a voltage across one or more of the at least two capacitors and a controller programmed to receive an input comprising each voltage sensed by the voltage sensing circuit, analyze the input using each sensed voltage to determine if a short circuit exists in the DC link capacitor bank, and control the protection relay and the set of pre-charge relays based on the analysis.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a system and method for protecting an ASD circuit from being damaged by a fault condition using a protection circuit including an intelligent circuit breaker, relay, or switch. Embodiments of the system and method disclosed differ from prior art systems by monitoring voltage and or current conditions on a DC link and/or a capacitor bank across the DC link to detect a short circuit. If a short circuit is detected, a logic circuit or controller operates the intelligent circuit breaker so that power cannot continue to flow to the DC link and cause a capacitor of the capacitor bank to damage the ASD circuit.

Figure 1:
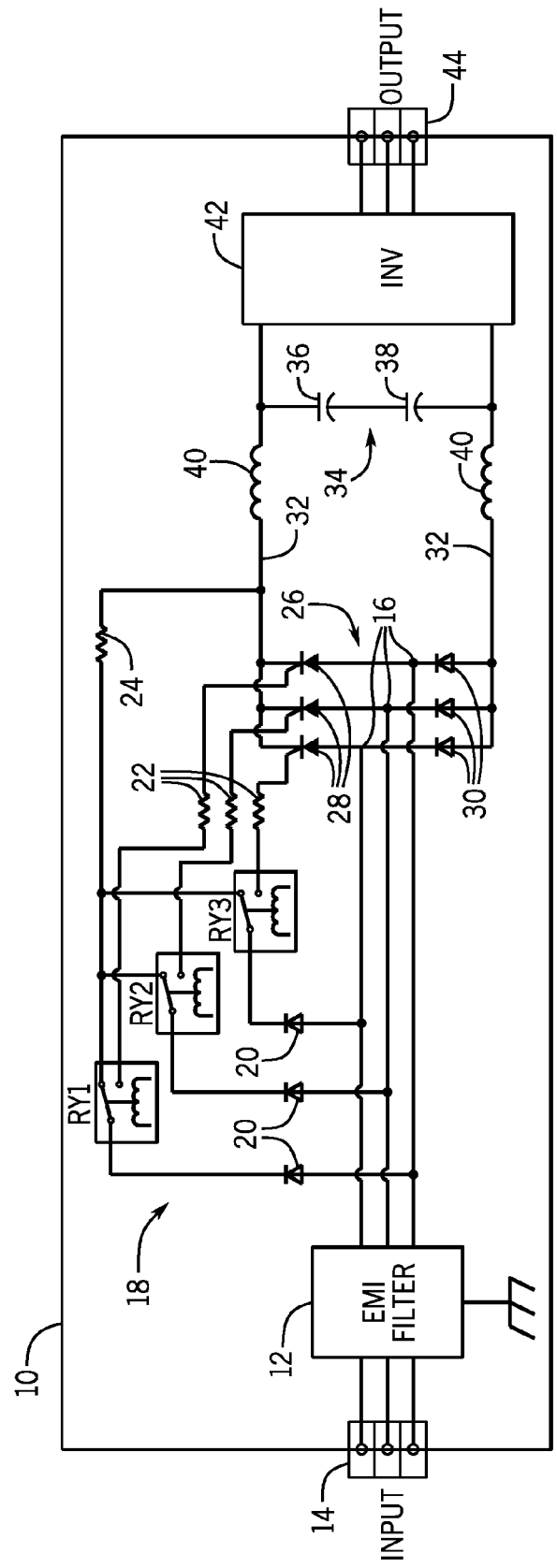
FIG. 1 is a schematic diagram of an ASD circuit as known in the prior art.
Figure 2:
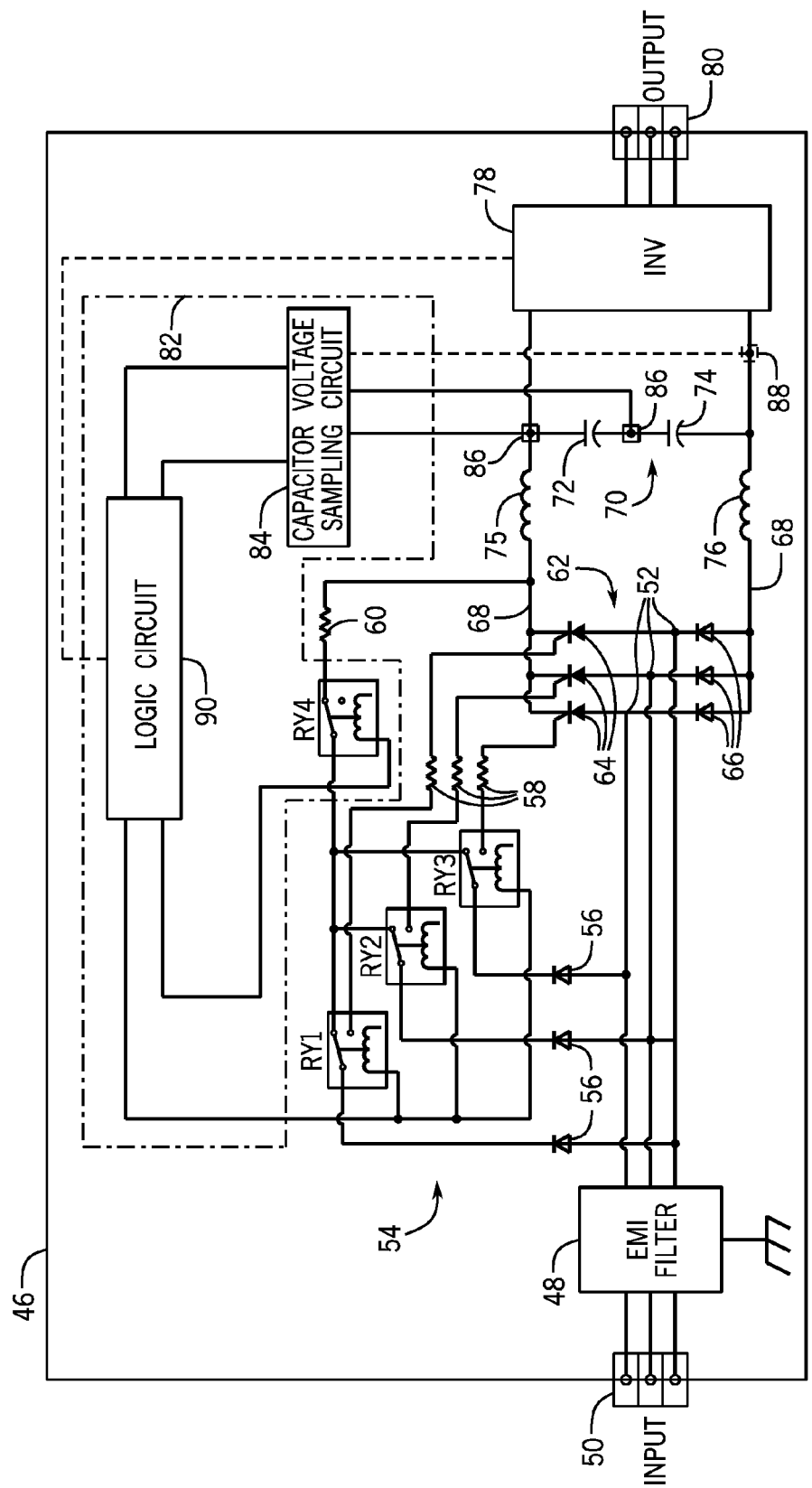
FIG. 2 is a schematic diagram of an ASD circuit according to an embodiment of the invention.

Referring to FIG. 2, an ASD or VFD circuit 46 is illustrated according to an exemplary embodiment of the invention. The ASD circuit 46 includes an electromagnetic interference (EMI) filter 48 provided between a drive input 50 and input rectifier terminals 52. ASD circuit 46 also includes a pre-charge circuit 54 including three pre-charge relays or switches RY1, RY2, RY3, one diode 56 and one gate resistor 58 in series with each pre-charge relay RY1, RY2, RY3, and one pre-charge resistor 60 in series with all three pre-charge relays RY1, RY2, RY3. Pre-charge relays RY1, RY2, RY3 are configured as single pole, double throw switches. A rectifier or rectifier bridge 62 for converting an AC input power (such as, for example, a utility grid) through drive input 50 into a DC power is coupled to EMI filter 48 and to pre-charge circuit 54. Rectifier bridge 62 includes SCRs or thyristors 64 that are each coupled in series with one diode 66 and electrically connected to one gate resistor 58 of pre-charge circuit 54.

ASD circuit 46 additionally includes a DC link or bus 68 that receives the DC power from rectifier bridge 62 and a DC link capacitor bank 70 with two capacitors 72, 74 across DC link 68. Capacitors 72, 74 each have the same capacitance. While capacitor bank 70 is shown with only two capacitors 72, 74, capacitor bank 70 may include additional capacitors connected in series or parallel with capacitors 72, 74 as needed. Two inductors 75, 76 are coupled in series with and on either side of rectifier bridge 62. An inverter 78 is coupled in parallel with the DC link capacitor bank 70, with an output 80 of inverter 78 providing a controlled three-phase power to a load driven thereby.

Pre-charge circuit 54 of ASD 46 operates to control and limit inrush current into DC link capacitor bank 70 during power up (when drive input 50 is initially coupled to an AC input power). When pre-charge relays RY1, RY2, RY3 are in an "OFF" or pre-charge state or position as shown in FIG. 2, pre-charge relays RY1, RY2, RY3 allow current to flow through the pre-charge resistor 60 to pre-charge capacitors 72, 74 of DC link capacitor bank 70. When pre-charge relays RY1, RY2, RY3 are in an "ON" or power state or position, pre-charge relays RY1, RY2, RY3 allow current to flow through corresponding gate resistors 58 to power on SCRs 64 of rectifier bridge 62.

ASD circuit 46 further includes a protection circuit 82 that operates to protect ASD circuit 46 from being damaged by a fault condition. Protection circuit 82 includes a voltage sampling or sensing circuit 84 having voltage sensors 86 positioned on capacitor bank 70. Voltage sensors 86 measure the voltage across capacitor 72. As shown in FIG. 2, according to one embodiment, voltage sampling circuit 84 may also include an optional voltage sensor 88 so that the voltage across capacitor 74 may be measured as well. Voltage sampling circuit 84 may include additional sensors depending on the number of capacitors in capacitor bank 70.

Protection circuit 82 further includes a protection relay or switch RY4 that is controlled by a logic circuit or controller 90. Logic circuit 90 may optionally control inverter 78 as well. Protection relay RY4 is configured as a single pole, single throw switch. Protection relay RY4 is positioned between pre-charge relays RY1, RY2, RY3 and pre-charge resistor 60. When protection relay RY4 is in an "OFF" or closed state or position, protection relay RY4 is closed and allows current to flow through pre-charge circuit 54 to DC link capacitor bank 70 via pre-charge resistor 60 connected to DC link 68 between rectifier bridge 62 and inductor 75. When protection relay RY4 is in an "ON" or open state or position, protection relay RY4 is open and disables pre-charge circuit 54 from supplying or directing current to DC link capacitor bank 70. Logic circuit 90 controls protection relay RY4 and pre-charge relays RY1, RY2, RY3 according to the voltage or voltages measured by voltage sampling circuit 84.

Logic circuit 90 controls relays RY1, RY2, RY3, RY4 based on three different states or conditions of ASD circuit 46: a pre-charge operating condition, a normal operating condition, and a short circuit condition. When ASD circuit 46 is in the pre-charge operating state, logic circuit 90 operates pre-charge relays RY1, RY2, RY3 in the OFF position and protection relay RY4 in the OFF position as shown in FIG. 2. During the pre-charge operating state, inverter 78 is off or disabled and current from an AC input power flows through pre-charge resistor 60 to DC link capacitor bank 70 to pre-charge capacitors 72, 74. Once capacitors 72, 74 are adequately charged, logic circuit 90 switches ASD circuit 46 into the normal operating state. When ASD circuit 46 is in the normal operating state, logic circuit 90 operates pre-charge relays RY1, RY2, RY3 in the ON position and protection relay RY4 in the OFF position. During the normal operating state, current from an AC input power flows through pre-charge circuit 54 to power on SCRs 64. Thus, rectifier bridge 62 is enabled to convert the AC input power into a DC power and relay the DC power to inverter 78, which is enabled or powered on to convert the DC power into an AC output power during the normal operating state.

Logic circuit 90 switches ASD circuit 46 into the short circuit state when a short circuit is detected in capacitor bank 70. When ASD circuit 46 is in the short circuit state, pre-charge relays RY1, RY2, RY3 are in the OFF state and protection relay RY4 is in the ON state—with pre-charge relays RY1, RY2, RY3 operating to prevent SCRs 64 from being powered on (as the gate signals thereto are disconnected) and protection relay RY4 operating to prevent pre-charge circuit 54 from supplying or directing current to DC link capacitor bank 70. Accordingly, during the short circuit state, no current may flow to DC link 70 because no current may flow through pre-charge circuit 54 and the SCRs 64 are prevented from being powered on. Hence, the combination of pre-charge relays RY1, RY2, RY3 and protection circuit 82 are an intelligent circuit breaker in ASD circuit 46—with the relays RY1, RY2, RY3, RY4 and the SCRs 64 forming what may be termed a "hybrid" circuit breaker comprised of both mechanical and solid-state switching devices.

In detecting a short circuit in capacitor bank 70, logic circuit 90 compares the voltage across capacitor 72 received from voltage sampling circuit 84 to a voltage threshold or limit such as, for example, an overvoltage threshold or an undervoltage threshold. If the voltage across capacitor 72 crosses or passes the voltage threshold, logic circuit 90 detects a shorted capacitor in capacitor bank 70 and switches ASD 46 into the short circuit state. In some embodiments, logic circuit 90 compares the voltage across capacitor 72 to both an overvoltage voltage threshold and an undervoltage threshold. The overvoltage and undervoltage thresholds may be set approximately 50-100 volts (V) from a nominal capacitor bank voltage and a short circuit voltage, respectively. For example, if the nominal voltage across capacitor bank 70 is 650V, both capacitors 72, 74 should have 325V thereacross. If capacitor 74 is shorted, then the entire 650V drop would be across capacitor 72, and the overvoltage threshold could be set to about 550-600V. If capacitor 72 develops a short circuit, then the voltage across capacitor 72 would drop to 0V, and the undervoltage threshold could be set to about 50-100V.

In various embodiments, the voltage across both capacitors 72, 74 may be measured by voltage sampling circuit 74. In one embodiment, logic circuit 90 compares the voltages across capacitors 72, 74 to voltage thresholds, such as, for example, the overvoltage and/or undervoltage thresholds described above. In another embodiment, logic circuit 90 calculates the difference between the voltage across capacitor 72 and the voltage across capacitor 74 and compares that difference to a voltage threshold. If the difference between the voltage across capacitor 72 and the voltage across capacitor 74 is greater than the voltage threshold, then the logic circuit 90 switches ASD circuit 46 into the short circuit state.

Figure 3:
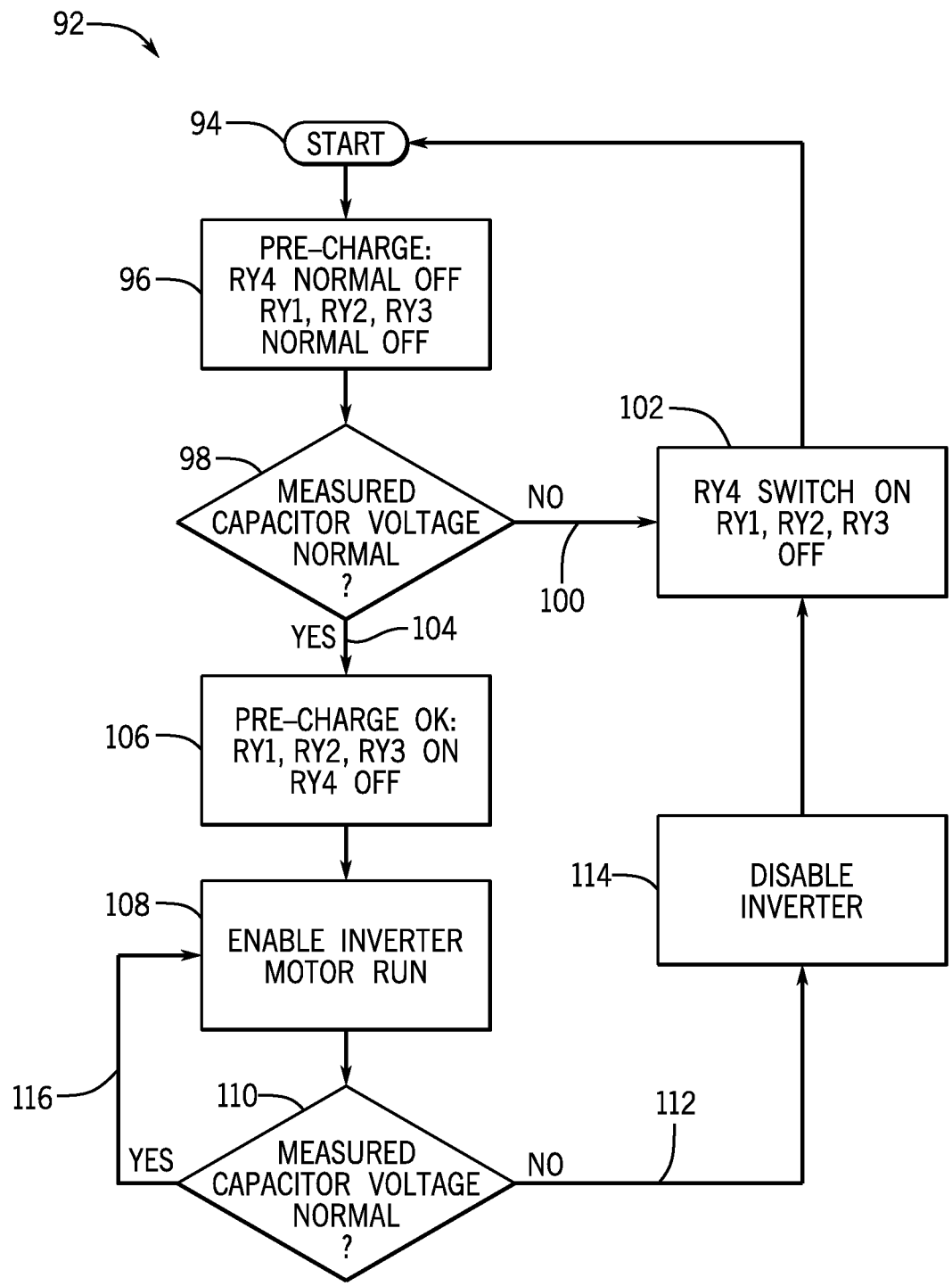
FIG. 3 is a flowchart illustrating a technique for controlling the ASD circuit of FIG. 2, according to an embodiment of the invention.

Referring now to FIG. 3, and with reference back to FIG. 2, a technique 92 for controlling ASD circuit 46 is shown, with the technique being performed by one or more controllers in or associated with ASD circuit 46, such as, for example, logic circuit 90 according to an embodiment of the invention. Process 92 starts at STEP 94 when an AC input power is applied at drive input 50—such as at the start of ASD circuit 46. At STEP 96, logic circuit 90 operates ASD circuit 46 in the pre-charge operating state such that pre-charge relays RY1, RY2, RY3 and protection relay RY4 are all in the OFF state to allow current to initially pre-charge DC link capacitor bank 70. Inverter 78 is disabled when ASD circuit 46 is in the pre-charge operating state.

While still in the pre-charge operating state, a determination is made at STEP 98 regarding whether all of the measured capacitor voltages are normal (whether DC link capacitor bank 70 has a shorted capacitor)—with such measurements being acquired via sensing circuit 84 and voltage sensors 86, 88. The determination at STEP 98 is either based on whether any measured capacitor voltage has exceeded a voltage limit defined in logic circuit 90 or based on whether a difference between capacitor voltages has exceeded a voltage limit. If it is determined at STEP 98 that any of the measured capacitor voltages are abnormal, as indicated at 100, logic circuit 90 switches ASD circuit 46 into the short circuit state at STEP 102, with pre-charge relays RY1, RY2, RY3 being operated in the OFF state and protection relay RY4 being operated in the ON state. Operation of pre-charge relays RY1, RY2, RY3 in the OFF state prevents the SCRs 64 from being powered on while operation of protection relay RY4 in the ON state prevents pre-charge circuit 54 from supplying or directing current to DC link capacitor bank 70. In addition or alternative to controlling the state of relays RY1, RY2, RY3, RY4 at STEP 102, logic circuit 90 may also disconnect ASD circuit 46 from the AC input power, according to one embodiment.

If it is instead determined at STEP 98 that all of the measured capacitor voltages are normal, as indicated at 104, logic circuit 90 determines at STEP 106 that ASD circuit 46 may be safely switched from the pre-charge operating state to the normal operating state and thus switches pre-charge relays RY1, RY2, RY3 from the OFF state to the ON state. At STEP 108, logic circuit 90 or another controller (not shown) enables inverter 78 and operates inverter 78 according to a control scheme, such as, for example, a pulse width modulation control scheme, so as to run a motor or other load.

While still in the normal operating state, a determination is made at STEP 110 as to whether all of the measured capacitor voltages are normal (in other words, whether DC link capacitor bank 70 has a shorted capacitor). The determination at STEP 110 is either based on whether any measured capacitor voltage has exceeded a voltage limit defined in logic circuit 90 or based on whether a difference between capacitor voltages has exceeded a voltage limit. If it is determined at STEP 110 that any of the measured capacitor voltages are abnormal, as indicated at 112, logic circuit 90 disables the inverter at STEP 114 and switches ASD circuit 46 into the short circuit state at STEP 102. Logic circuit 90 may also disconnect ASD circuit 46 from the AC input power. If it is instead determined at STEP 110 that all of the measured capacitor voltages are normal, as indicated at 116, logic circuit 90 returns to STEP 108 and continues to operate ASD circuit 46 in the normal operating state.

Figure 4:
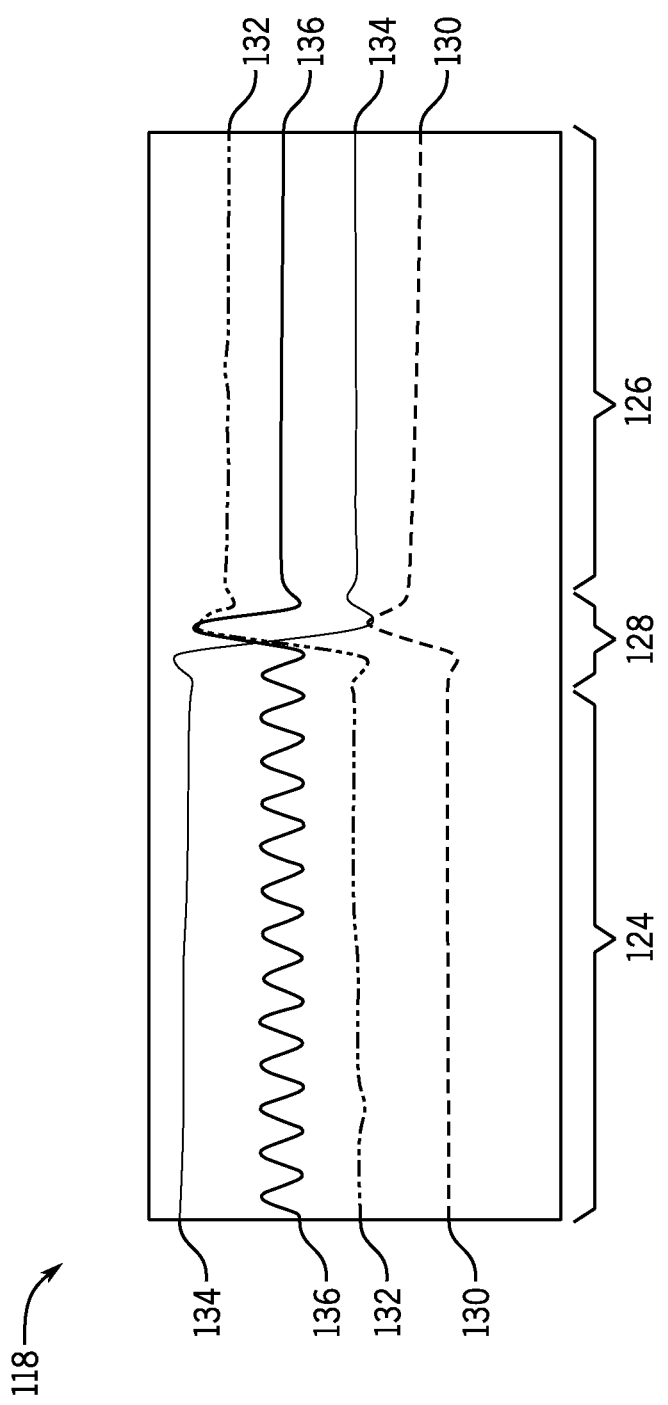
FIG. 4 is a graph illustrating the operation of the ASD circuit of FIG. 2 upon detection of a capacitor short condition, according to an exemplary embodiment of the invention.

Referring now to FIG. 4, with reference back to FIG. 2, a graph 118 illustrating the operation of ASD circuit 46 upon detection of a capacitor short condition is shown according to an exemplary embodiment of the invention. Graph 118 shows the operation of ASD circuit 46 during a normal operating state 124, a short circuit state 126, and a switching period 128 in between.

Graph 118 includes four lines: a capacitor voltage line 130 showing the voltage across capacitor 72 of capacitor bank 70, a protection relay line 132 showing the state of protection relay RY4, a pre-charge relay line 134 showing the state of pre-charge relays RY1, RY2, RY3, and an input current line 136 showing the level of current from an AC input power. Capacitor voltage line 130 shows that the voltage across capacitor 72 was normal, and then capacitor 72 developed an undervoltage condition at the end of the normal operating state 124. At that point, logic circuit detected a short circuit in capacitor 72 and controlled relays RY1, RY2, RY3, RY4 to switch to the short circuit state 126 at the beginning of switching period 128.

Protection relay line 132 shows protection relay RY4 in the OFF state during normal operating state 124, and pre-charge relay line 134 shows pre-charge relays in the ON state during normal operating state 124. Once logic circuit 90 detected the short circuit at the end of normal operating state 124, protection relay RY4 began switching to the ON state and pre-charge relays RY1, RY2, RY3 began switching to the OFF state during switching period 128. At the start of short circuit state 126, protection relay RY4 is in the ON state, and pre-charge relays RY1, RY2, RY3 are in the OFF state. Input current line 136 shows that the current from the AC input power was being supplied to ASD circuit 46 during normal operating state 124. Once logic circuit 90 detected the short circuit and switched ASD circuit 46 to short circuit state 126, ASD circuit 46 no longer received the AC input power.

Beneficially, embodiments of the invention thus provide an ASD circuit having built-in protections against a short circuit caused by a shorted capacitor in a DC link capacitor bank. The ASD circuit includes a protection circuit including a protection relay added between a plurality of pre-charge relays and a pre-charge resistor. The protection relay is able to isolate the DC link from an AC input power in combination with the pre-charge relays. A voltage sampling circuit senses DC link capacitor voltage, and a logic circuit analyzes the sampled voltages against one or more voltage thresholds pre-defined in the logic circuit. If the sampled voltages have crossed a voltage threshold, the logic circuit triggers a short circuit condition in the ASD circuit, switching the protection relay to an open position and the pre-charge relays to a pre-charge position so that no current may flow to the DC link.

The incorporation of the protection circuit into the ASD circuit provides an effective solution to prevent damage to the ASD circuit from a capacitor short. The ASD circuit provides such protection with the inverter thereof in both an operating and non-operating state, such that the ASD circuit meets requirements of the UL breakdown of components test.

According to one embodiment of the present invention, an ASD circuit includes an input connectable to an AC source, a solid-state switch rectifier bridge connected to the input to convert an AC power input to a DC power, a DC link coupled to the solid-state rectifier bridge to receive the DC power therefrom, and a DC link capacitor bank comprising at least first and second capacitors connected to the DC link to smooth the DC link voltage, each capacitor of the DC link capacitor bank having a capacitor voltage thereacross. The ASD circuit also includes a pre-charge circuit coupled between the input and the DC link capacitor bank, the pre-charge circuit comprising a plurality of pre-charge relays each operable in an on state that allows the AC power input to power the solid-state switch rectifier bridge during a normal operating state and an off state that allows the AC power input to pre-charge the DC link capacitor bank through a pre-charge resistor of the pre-charge circuit during a pre-charge operating state. The ASD circuit further includes a protection circuit comprising a protection relay coupled between the plurality of pre-charge relays and the DC link capacitor bank, the protection relay operable in an on state that prevents the pre-charge circuit from connecting to the DC link capacitor bank when a capacitor short circuit occurs and an off state that allows the pre-charge circuit to electrically connect to the DC link capacitor bank.

According to another embodiment of the present invention, a method of operating an ASD circuit that comprises a rectifier, a DC link having a DC link capacitor bank with two or more capacitors, a pre-charge circuit, a protection circuit, and an inverter is provided. The method includes receiving an AC power at an input of the ASD circuit, providing the AC power to the rectifier to convert the AC power to a DC power on the DC link, measuring one or more capacitor voltages in the DC link capacitor bank via one or more voltage sensors, and providing the one or more measured capacitor voltages to a controller in operable communication with the one or more voltage sensors, the pre-charge circuit, and the protection circuit. The method also includes analyzing, via the controller, the one or more capacitor voltages during one of a pre-charge voltage condition and a normal voltage condition to detect if one or more capacitors of the DC link capacitor bank have developed a short circuit. The method further includes selectively operating, via the controller, a protection relay in the protection circuit and a set of pre-charge relays in the pre-charge circuit in an on state and an off state, respectively, based on the analyzed one or more capacitor voltages, so as to prevent damage to the ASD circuit as a result of a short circuit on the DC link capacitor bank.

According to yet another embodiment of the present invention, an ASD circuit includes a rectifier comprising an SCR bridge and a DC link coupled to the rectifier to receive a DC link voltage therefrom, the DC link having a DC link capacitor bank thereon that includes at least two capacitors. The ASD circuit also includes a pre-charge circuit comprising a set of pre-charge relays coupled to the DC link capacitor bank via the DC link, the pre-charge circuit configured to control an initial pre-charge of the DC link capacitor bank via the set of pre-charge relays. The ASD circuit further includes a protection circuit having a protection relay operable in an on and an off position to selectively control a current flowing through the pre-charge circuit to the DC link capacitor bank, a voltage sensing circuit for sensing a voltage across one or more of the at least two capacitors and a controller programmed to receive an input comprising each voltage sensed by the voltage sensing circuit, analyze the input using each sensed voltage to determine if a short circuit exists in the DC link capacitor bank, and control the protection relay and the set of pre-charge relays based on the analysis.

The present invention has been described in terms of the preferred embodiment, and it is recognized that equivalents, alternatives, and modifications, aside from those expressly stated, are possible and within the scope of the appending claims.

What is claimed is:

1. An adjustable speed drive (ASD) circuit comprising:
an input connectable to an AC source;
a solid-state switch rectifier bridge connected to the input to convert an AC power input to a DC power;
a DC link coupled to the solid-state rectifier bridge to receive the DC power therefrom;
a DC link capacitor bank comprising at least first and second capacitors connected to the DC link to smooth the DC link voltage, each capacitor of the DC link capacitor bank having a capacitor voltage thereacross;
a pre-charge circuit coupled between the input and the DC link capacitor bank, the pre-charge circuit comprising a plurality of pre-charge relays each operable in an on state that allows the AC power input to power the solid-state switch rectifier bridge during a normal operating state and an off state that allows the AC power input to pre-charge the DC link capacitor bank through a pre-charge resistor of the pre-charge circuit during a pre-charge operating state; and
a protection circuit comprising a protection relay coupled between the plurality of pre-charge relays and the DC link capacitor bank, the protection relay operable in an on state that prevents the pre-charge circuit from connecting to the DC link capacitor bank when a capacitor short circuit occurs and an off state that allows the pre-charge circuit to electrically connect to the DC link capacitor bank.

2. The ASD circuit of claim 1 wherein, when the protection relay is in the on state and the plurality of pre-charge relays are in the off state, the protection and pre-charge relays prevent the DC link from receiving the DC power.

3. The ASD circuit of claim 1 wherein the protection circuit further comprises:
a voltage sampling circuit that measures a first capacitor voltage across the first capacitor; and
a logic circuit that receives the first capacitor voltage from the voltage sampling circuit, the logic circuit programmed to control the protection relay and the plurality of pre-charge relays based on the first capacitor voltage.

4. The ASD circuit of claim 3 wherein the logic circuit is further programmed to:
compare the first capacitor voltage to a first voltage threshold; and
if the at least one capacitor voltage crosses the first voltage threshold, operate the protection relay in the on state and the plurality of pre-charge relays in the off state to prevent the DC link from receiving the DC power.

5. The ASD circuit of claim 4 wherein the logic circuit is further programmed to:
compare the first capacitor voltage to a second voltage threshold; and
if the at least one capacitor voltage crosses the second voltage threshold, operate the protection relay in the on state and the plurality of pre-charge relays in the off state to prevent the DC link from receiving the DC power.

6. The ASD circuit of claim 5 wherein the first voltage threshold comprises a capacitor overvoltage condition and the second voltage threshold comprises a capacitor undervoltage condition.

7. The ASD circuit of claim 1 wherein the protection circuit further comprises:
a voltage sampling circuit that measures a first capacitor voltage across the first capacitor and a second capacitor voltage across the second capacitor; and
a logic circuit that receives the first and second capacitor voltages from the voltage sampling circuit, the logic circuit programmed to control the protection relay and the plurality of pre-charge relays based on the first and second capacitor voltages.

8. The ASD circuit of claim 7 wherein the logic circuit is further programmed to:
compare the first capacitor voltage to the second capacitor voltage;
operate each of the protection relay in the on state and the plurality of pre-charge relays in the off state if a difference between the first capacitor voltage and the second capacitor.

9. A method of operating an adjustable speed drive (ASD) circuit that comprises a rectifier, a DC link having a DC link capacitor bank with two or more capacitors, a pre-charge circuit, a protection circuit, and an inverter, the method comprising:
receiving an AC power at an input of the ASD circuit;
providing the AC power to the rectifier to convert the AC power to a DC power on the DC link;
measuring one or more capacitor voltages in the DC link capacitor bank via one or more voltage sensors;
providing the one or more measured capacitor voltages to a controller in operable communication with the one or more voltage sensors, the pre-charge circuit, and the protection circuit;
analyzing, via the controller, the one or more capacitor voltages during one of a pre-charge voltage condition and a normal voltage condition to detect if one or more capacitors of the DC link capacitor bank have developed a short circuit; and
selectively operating, via the controller, a protection relay in the protection circuit and a set of pre-charge relays in the pre-charge circuit in an on state and an off state, respectively, based on the analyzed one or more capacitor voltages, so as to prevent damage to the ASD circuit as a result of a short circuit on the DC link capacitor bank.

10. The method of claim 9 wherein analyzing the one or more capacitor voltages comprises comparing a first measured capacitor voltage to a first voltage threshold; and
if the first measured capacitor voltage passes the first voltage threshold, detecting a short circuit in the DC link capacitor bank.

11. The method of claim 10 wherein analyzing the one or more capacitor voltages further comprises comparing the first measured capacitor voltage to a second voltage threshold; and
if the first measured capacitor voltage passes the second voltage threshold, detecting a short circuit in the DC link capacitor bank.

12. The method of claim 11 wherein comparing the first measured capacitor voltage to the first and second voltage thresholds comprises comparing the first measured capacitor voltage to a capacitor overvoltage threshold and an undervoltage threshold.

13. The method of claim 9 wherein selectively operating the protection relay and the set of pre-charge relays based on the analyzed one or more capacitor voltages comprises simultaneously switching the set of pre-charge relays from the on state to the off state to disconnect the pre-charge relays from the rectifier and switching the protection relay from the off state to the on state to disable the set of pre-charge relays from electrically connecting to the DC link capacitor bank.

14. The method of claim 13 further comprising disconnecting the AC power from the input of the ASD circuit based on the analyzed one or more capacitor voltages.

15. The method of claim 9 wherein analyzing the one or more capacitor voltages comprises comparing a first measured capacitor voltage to a second measured capacitor voltage; and
    if the difference between the first measured capacitor voltage and the second measured capacitor voltage exceeds a voltage threshold, detecting a short circuit in the DC link capacitor bank.

16. An adjustable speed drive (ASD) circuit comprising:
a rectifier comprising a silicon-controlled rectifier (SCR) bridge;
a DC link coupled to the rectifier to receive a DC link voltage therefrom, the DC link having a DC link capacitor bank thereon that includes at least two capacitors;
a pre-charge circuit comprising a set of pre-charge relays coupled to the DC link capacitor bank via the DC link, the pre-charge circuit configured to control an initial pre-charge of the DC link capacitor bank via the set of pre-charge relays; and
a protection circuit comprising:
    a protection relay operable in an on and an off position to selectively control a current flowing through the pre-charge circuit to the DC link capacitor bank;
    a voltage sensing circuit for sensing a voltage across one or more of the at least two capacitors; and
    a controller programmed to:
        receive an input comprising each voltage sensed by the voltage sensing circuit;
        analyze the input using each sensed voltage to determine if a short circuit exists in the DC link capacitor bank; and
        control the protection relay and the set of pre-charge relays based on the analysis.

17. The ASD circuit of claim 16 wherein the controller is programmed to analyze the input by:
    comparing each sensed voltage to one or more voltage thresholds; and
    if at least one sensed voltage crosses a respective one of the one or more voltage thresholds, controlling the protection relay and the set of pre-charge relays to disable the current from flowing to the DC link.

18. The ASD circuit of claim 16 wherein the set of pre-charge relays of the pre-charge circuit are each operable in an on state that allows current to flow to the rectifier during a normal operating condition and an off state that allows current to pre-charge the DC link capacitor bank through a pre-charge resistor during a pre-charge operating condition;
    wherein the protection relay is coupled between the set of pre-charge relays and the DC link capacitor bank and is operable in an on state that prevents the pre-charge circuit from electrically coupling to the DC link capacitor bank and an off state that allows the pre-charge circuit to electrically couple to the DC link capacitor bank; and
    wherein, when the protection relay is in the on state and the plurality of pre-charge relays are in the off state, the protection and pre-charge relays prevent the DC link from receiving the DC voltage.

19. The ASD circuit of claim 16 wherein the voltage sensing circuit senses a first capacitor voltage and a second capacitor voltage; and
    wherein the controller is programmed to analyze the input by:
        comparing the first capacitor voltage to the second capacitor voltage; and
        if a difference between the first capacitor voltage and the second capacitor voltage is greater than a voltage threshold, controlling the protection relay and the set of pre-charge relays to disable the current from flowing to the DC link.

20. The ASD circuit of claim 16 wherein the controller is further programmed to:
    control the protection relay and the set of pre-charge relays to operate in:
        a pre-charge operating condition during which the DC capacitor bank is pre-charged and the rectifier and an inverter coupled to the DC link are disabled; and
        a normal operating condition during which the rectifier is enabled to supply the DC link voltage to the DC link and the inverter is enabled to invert the DC link voltage to an AC output voltage; and
    analyze the input using each sensed voltage to determine if a short circuit exists in the DC link capacitor bank during each of the pre-charge operating condition and the normal operating condition.

\* \* \* \* \*